June 19, 1934.   H. A. FINK ET AL   1,963,083
AUTOMATIC CONTROL MECHANISM FOR CAN MAKING MACHINES
Original Filed Feb. 26, 1930   5 Sheets-Sheet 1
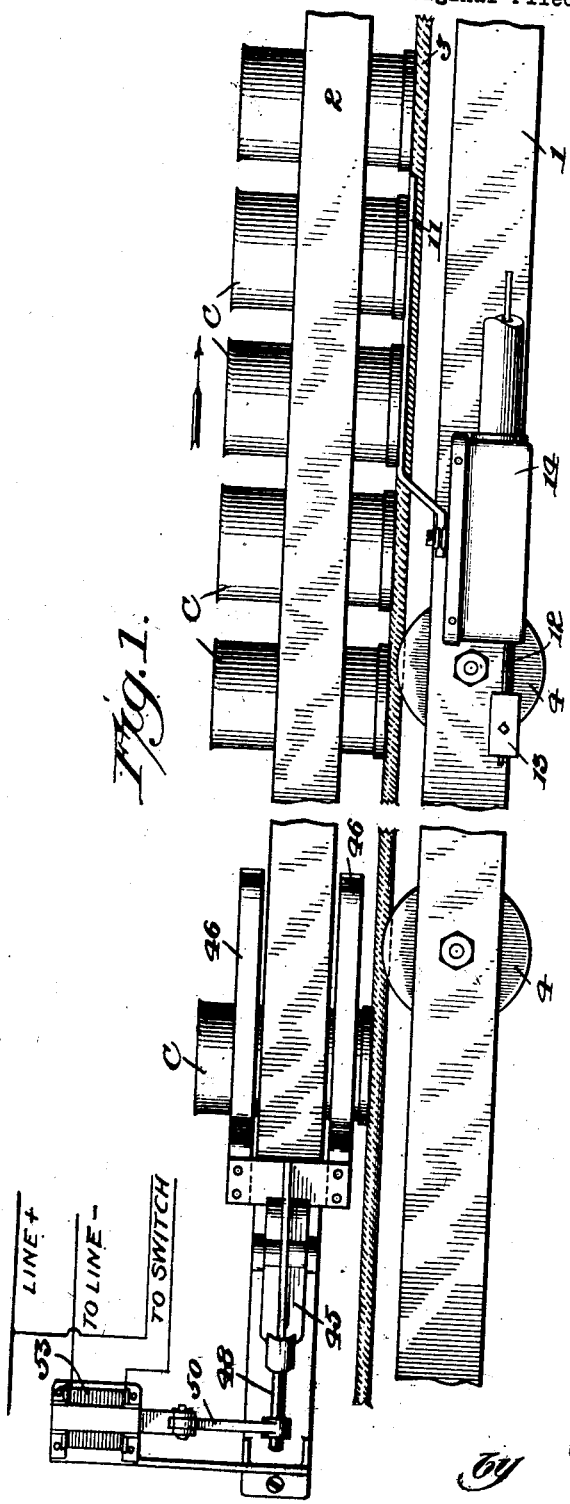
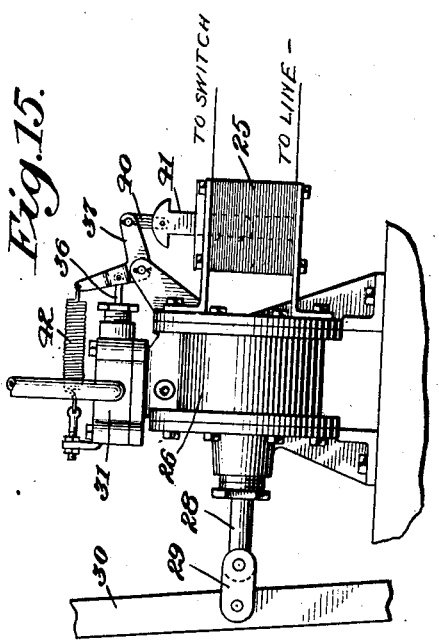
Inventors:
Henry A. Fink
J. E. Schmidt
Sturtevant & Mason
Attys June 19, 1934. H. A. FINK ET AL 1,963,083
AUTOMATIC CONTROL MECHANISM FOR CAN MAKING MACHINES
Original Filed Feb. 26, 1930 5 Sheets-Sheet 2

Inventors:
Henry A. Fink
J. E. Schmidt
Sturtevant & Mason
Attys

June 19, 1934.   H. A. FINK ET AL   1,963,083
AUTOMATIC CONTROL MECHANISM FOR CAN MAKING MACHINES
Original Filed Feb. 26, 1930   5 Sheets-Sheet 3

Inventors:
Henry A. Fink
J. E. Schmidt
Sturtevant & Mason
Attys

June 19, 1934.　　H. A. FINK ET AL　　1,963,083
AUTOMATIC CONTROL MECHANISM FOR CAN MAKING MACHINES
Original Filed Feb. 26, 1930　　5 Sheets-Sheet 4
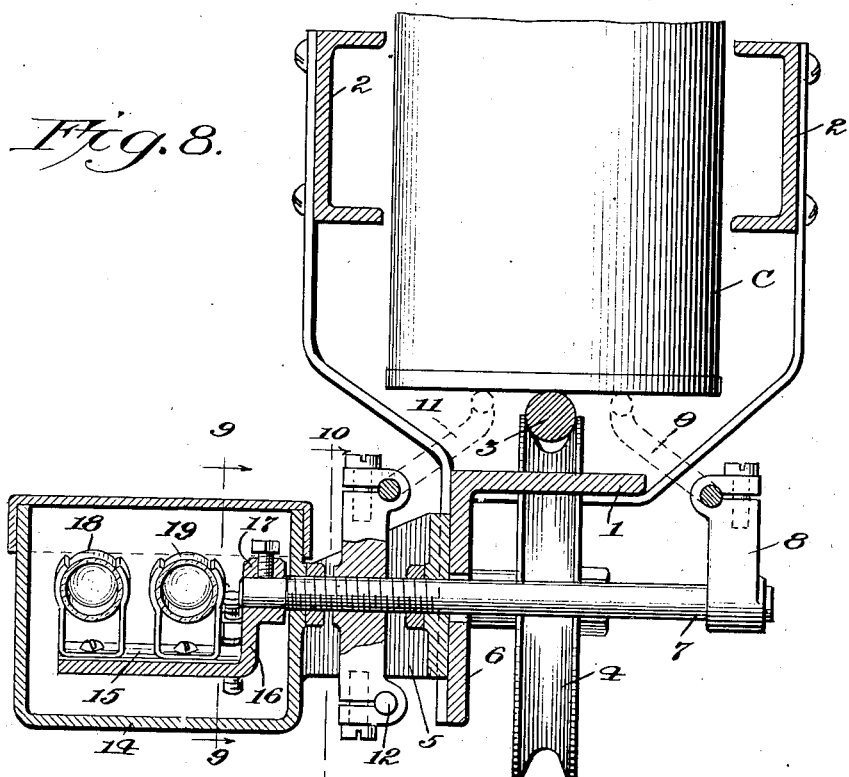
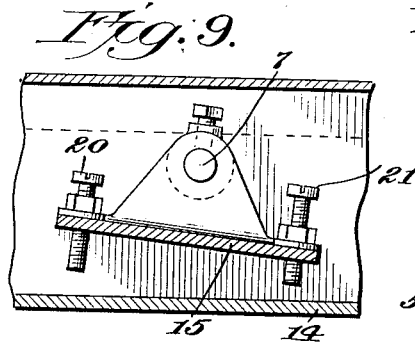
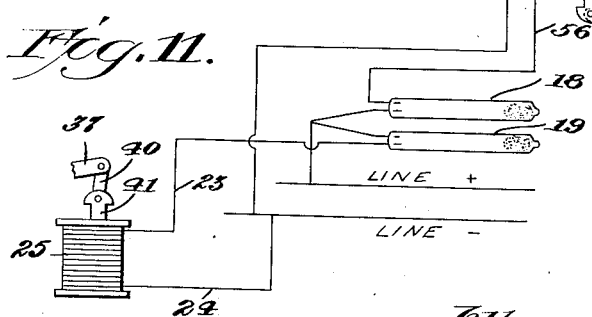
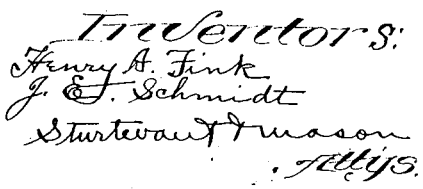

June 19, 1934.    H. A. FINK ET AL    1,963,083
AUTOMATIC CONTROL MECHANISM FOR CAN MAKING MACHINES
Original Filed Feb. 26, 1930    5 Sheets-Sheet 5

Inventors
Henry A. Fink
J. E. Schmidt
Sturtevant Mason
Attys

Patented June 19, 1934

1,963,083

UNITED STATES PATENT OFFICE 1,963,083

AUTOMATIC CONTROL MECHANISM FOR CAN MAKING MACHINES

Henry A. Fink, New York, N. Y., and John E. Schmidt, Chicago, Ill., assignors to Continental Can Company, Inc., New York, N. Y., a corporation of New York Application February 26, 1930, Serial No. 431,545
Renewed June 24, 1932

8 Claims. (Cl. 192—125)

The invention relates to new and useful improvements in an automatic control mechanism for can making machines wherein the operation of the machine is controlled by the articles delivered to the machine.

An object of the invention is to provide a control mechanism whereby the machine is automatically stopped when there are no articles to be operated upon being delivered to the machine, and wherein the machine is automatically started when the articles to be operated upon accumulate sufficiently so as to supply the demand of the machine when in continuous operation.

A further object of the invention is to provide a control mechanism of the above type wherein the means for feeding the articles operates independently and continuously while the machine operating on the articles is automatically stopped and started.

These and other objects will in part be obvious and will in part be hereinafter more fully disclosed.

In the drawings which show by way of illustration one embodiment of the invention:—

Figure 1 is a view in side elevation showing a can line with the improved control mechanism applied thereto.

Fig. 8 is an enlarged sectional view on the line 8—8 of Fig. 6.

Fig. 9 is a sectional view on the line 9—9 of Fig. 8.

Fig. 10 is a sectional view on the line 10—10 of Fig. 8.

Fig. 11 is a diagrammatic view showing the circuits and the controlling solenoids associated therewith.

Fig. 15 is a view more or less diagrammatically of the means for rendering the machine operative and inoperative.

Figure 2:
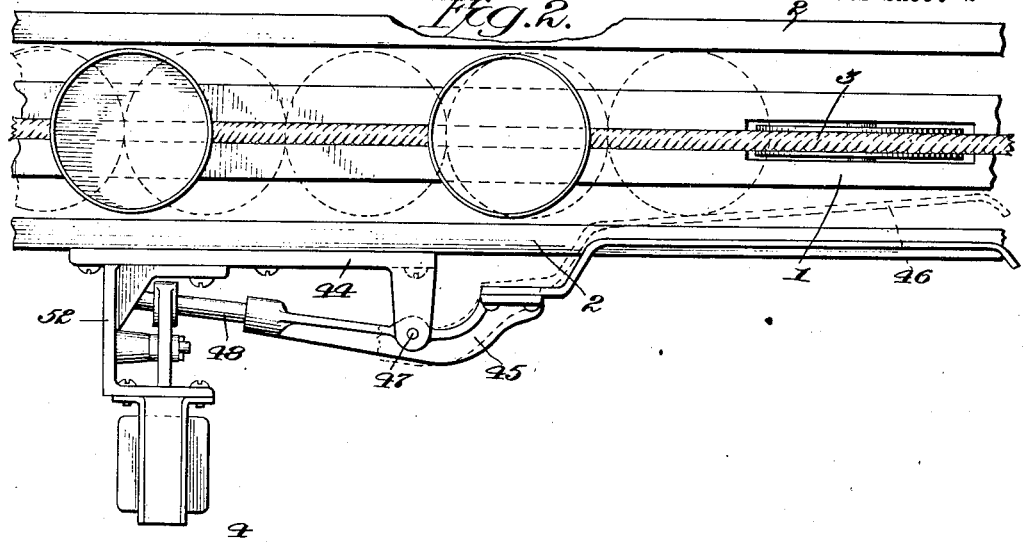
Fig. 2 is a plan view of a portion of the same.
Figure 3:
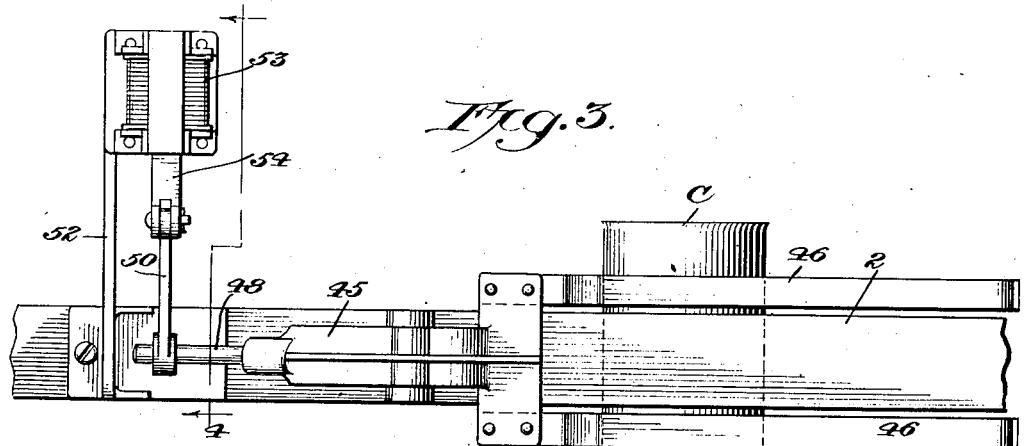
Fig. 3 is a side view of the parts shown in Fig. 2.

The invention is directed to an automatic control mechanism for a can making machine which is so constructed as to stop the machine when the cans to be operated upon give out and which is automatically started when the cans to be operated upon accumulate in sufficient quantity to supply the demand for continuous operation of the machine. The control may be applied to any type of can making machine and in fact may be used on any type of article making machine. Therefore, the term "can" as used in the description and claims is intended to cover broadly any type of article or any portion of a can body, such as the body before the end is applied thereto, the body after it is flanged, or the body after the bottom end is applied thereto.

Associated with the machine is a runway along which the cans are conveyed by a continuously operating belt which frictionally engages the cans and moves them along the runway. The cans are delivered from the runway into the machine to be operated upon. Associated with the runway is an automatic stopping device which includes an electric switch and a swinging member which is yieldingly forced against the cans as they pass along the runway so that when the supply of cans gives out, then this member will move into the runway and by its movement establish an electric circuit which in turn through a pneumatically operated device stops the machine. At the same time when this member establishes a circuit for stopping the machine, it also establishes a circuit which causes an arm to be yieldingly moved into the path of travel of the cans in the runway, which arm is located in advance of the member which operates the switch to stop the machine. This arm will stop the cans as they are again brought into the line, and if they are of a straggling character, it will retard the cans and hold them until they accumulate sufficiently to crowd their way by this yielding member. Then it is that the cans operate upon the member which is extended into the path of their travel for shifting the electric switch to break the circuit and thus automatically start the machine.

Referring more in detail to the drawings, the invention is shown as applied to a governor for a machine for making cans and the cans are indicated in the drawings at C. As noted above, these cans may be merely in the form of cylindrical bodies, or they may be flanged, or may have their ends attached thereto, as the control is intended to be used in connection with a flanger, a double seamer, or a tester. When the machines operate in lines it is very important that when there are no cans to be operated upon, the machine stops and at the same time when the cans accumulate, so that the machine may be supplied continuously, then to have the machine automatically start its operation. This is the purpose of the present invention.

The cans indicated at C are moved along a runway which consists of a lower plate 1 and side guide rails 2, 2. The cans are conveyed along the runway by a belt 3. This belt passes above the lower plate 1 and the cans rest on the belt and are frictionally carried along therewith. The belt runs over pulleys along the lines, such as indicated at 4, 4. Mounted on a bracket 5 attached to a depending portion 6 carried by the plate 1 is a shaft 7. This shaft carries a bracket 8 in which is mounted an arm 9. It also carries a bracket 10 in which is mounted an arm 11. These arms 9 and 11 extend along the runway above the plate 1. The arms are rigidly attached to the shaft.

Figure 6:
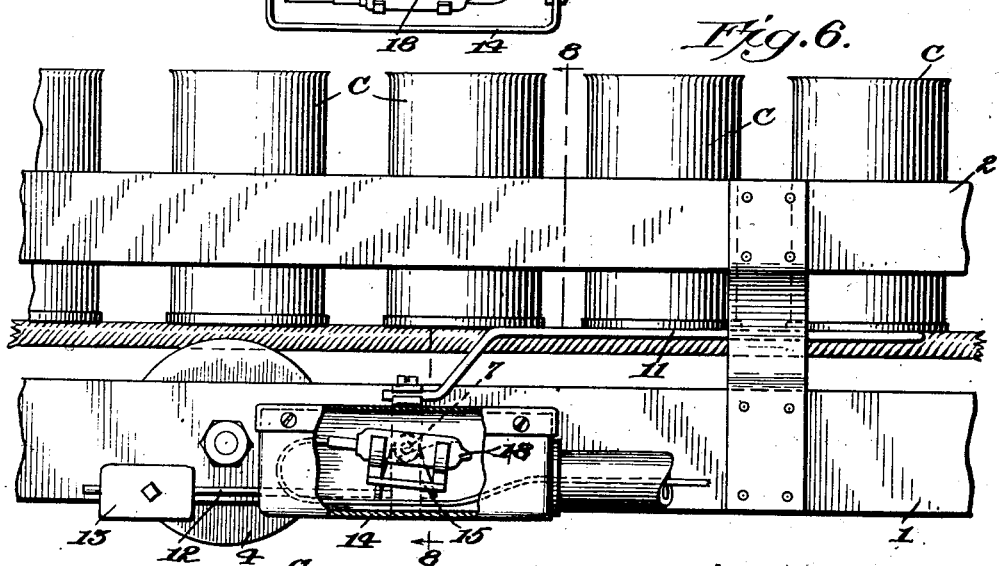
Fig. 6 is a side view of the parts shown in Fig. 5, with the box for the switch sectioned so as to show the parts within and the switch tube positioned so that the machine is in operation.
Figure 7:
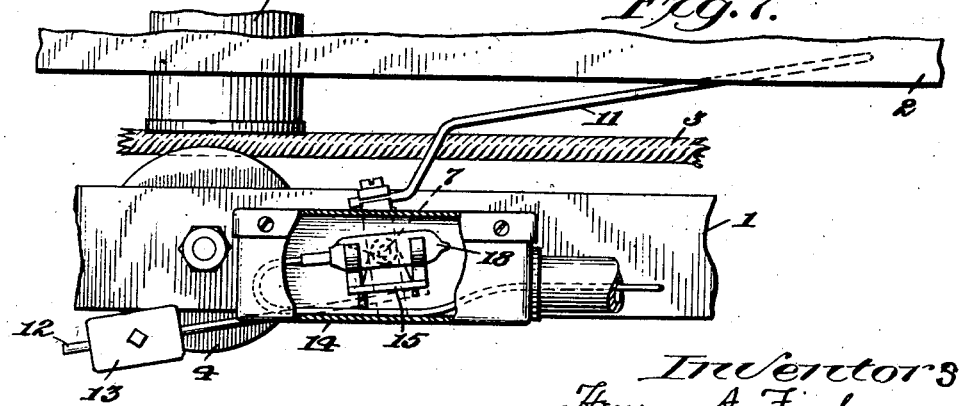
Fig. 7 is a view similar to Fig. 6, but showing the switch parts positioned so as to stop the machine.

Also mounted on the bracket 10 is an arm 12 which carries a weight 13. This weight 13 tends to turn the shaft so as to raise the arms 9 and 11 and project them across the path of travel of the cans. As long as there are cans being conveyed along the runway, the arms 9 and 11 are held depressed, as clearly shown in Figs. 1 and 6. When, however, the cans give out so that there are no cans in the runway, then the arms will swing to the dotted line position of Fig. 7 through the action of the weight 13.

Mounted on the bracket 5 is a switch box 14. The shaft 7 extends into this switch box and is provided with a supporting plate 15 carried by a depending member 16 attached to a collar 17 which is fixed to the shaft 7. Mounted on this plate 15 are two mercury switch tubes 18 and 19. The plate is also provided with stops 20 and 21 which limit the oscillating movement of the shaft 7. When the arms are depressed by the passing cans, then these tubes are tilted so that the mercury will run to the right hand end of the tubes as viewed in Fig. 6 and the circuit will be broken. When, however, the tubes are tilted to the position shown in Fig. 7, then the mercury will run to the left hand end of the tubes and the circuits will be established.

Figure 12:
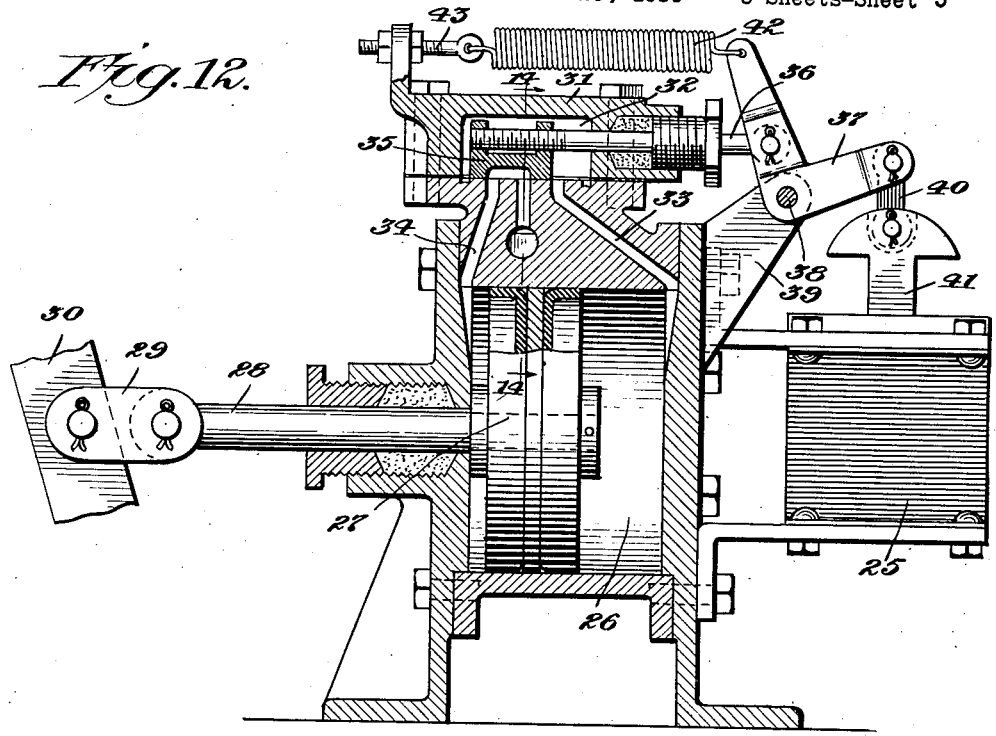
Fig. 12 is an enlarged sectional view through the electrically controlled pneumatically operated devices for shifting the clutch.
Figure 13:
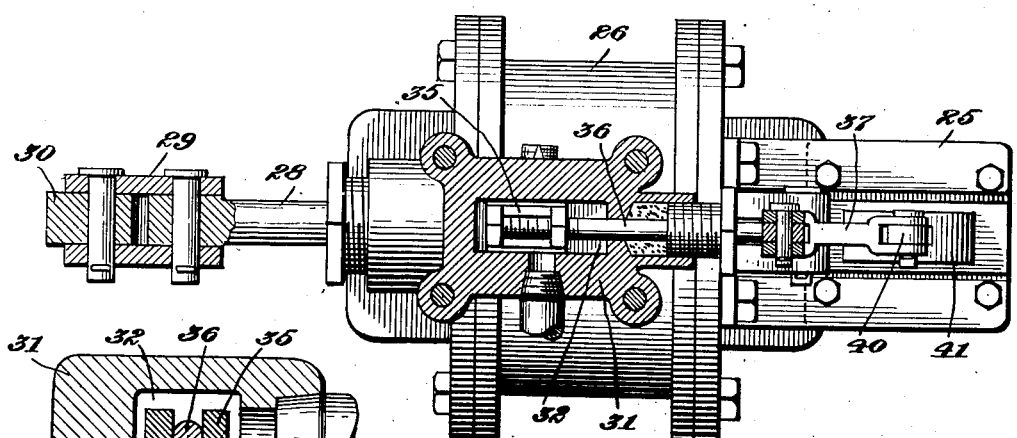
Fig. 13 is a view partly in plan and partly in section of the same.
Figure 14:
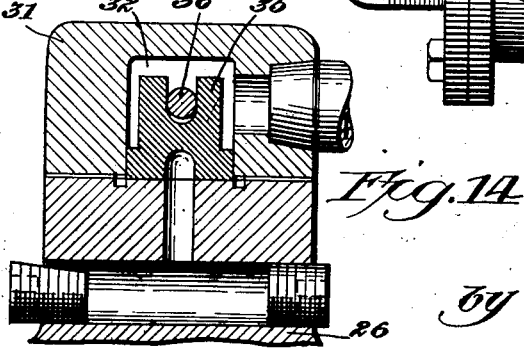
Fig. 14 is a sectional view on the line 14—14 of Fig. 12.

The tube 19 is the controlling switch for the lines 23 and 24 which lead to a solenoid 25. This solenoid is associated with the pneumatic clutch shifting mechanism illustrated in Figs. 12, 13 and 14. This clutch shifting mechanism consists of a cylinder 26 in which is mounted a piston 27. The piston 27 is attached to a piston rod 28 which is connected by a link 29 to a clutch shifting lever 30. Mounted on the cylinder is a housing 31 provided with a valve chamber 32. A port 33 leads from this valve chamber to the cylinder at one side of the piston, and a port 34 leads from the valve chamber to the cylinder at the other side of the piston. A valve 35 is shiftable in the valve chamber 32. This valve is carried by a rod 36 which is attached to a bell crank 37 pivoted at 38 to a bracket 39. The bell crank 37 is connected by a link 40 to the armature 41 of the solenoid 25. The bell crank is also attached to one end of a spring 42, the other end of which is attached to an adjustable anchor 43 carried by the cylinder. When the solenoid 25 is energized then the bell crank is oscillated in a clockwise direction which shifts the valve to the right as viewed in Fig. 12 and this will allow air to pass through the port 34 so as to cause the piston to shift to the right as viewed in Fig. 12. This shifts the clutch lever so as to stop the machine.

When the current through the solenoid is broken, then the spring 42 will shift the valve in the opposite direction and the clutch lever will be positively shifted so as to start the machine. Thus it will be seen that when the cans give out, the weight 13 will swing the arms 9 and 11 upwardly and at the same time will cause the plate carrying the mercury switch tubes to tilt so as to establish the circuit and this energizes the solenoid 25 causing a shifting of the valve which stops the machine.

Figure 4:
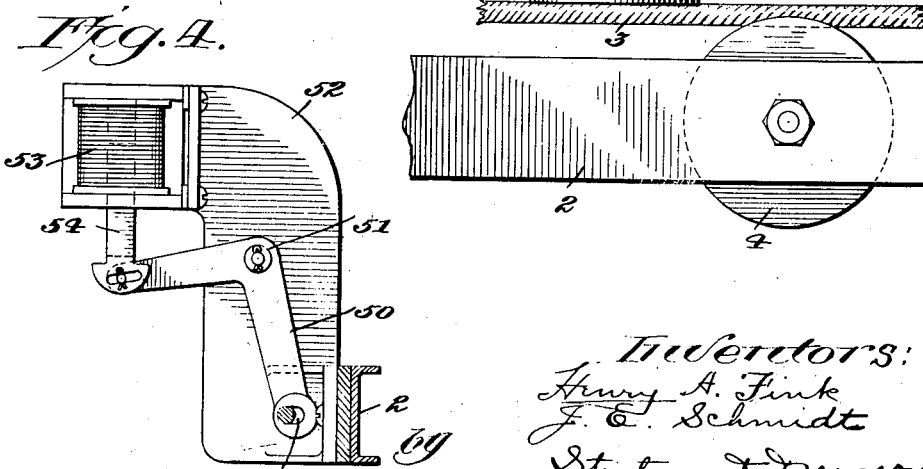
Fig. 4 is a side elevation on the line 4—4 of Fig. 3.
Figure 5:
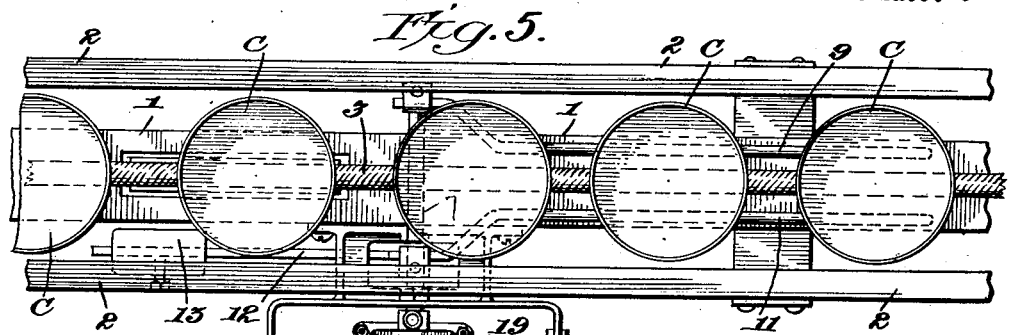
Fig. 5 is a plan view of the runway showing the automatic stopping means.

Mounted alongside of the runway at a position in advance of the controlling arms 9 and 11 is a bracket 44. This bracket is attached to one of the rails 2. Pivotally mounted on the bracket is a lever 45. This lever 45 is provided with arms 46, one of which is above the guide rail 2 and the other is below the guide rail. The lever 45 is pivoted at 47 to the bracket 44. The lever carries a finger 48 which projects through an opening 49 in a bell crank 50 which is pivoted at 51 to a section 52 of the bracket 44. Also attached to this section 52 is a solenoid 53. The armature 54 of the solenoid is connected to the bell crank 50. When the solenoid is energized the bell crank will be swung in a clockwise direction as viewed in Fig. 4, and this swings the finger 48 away from the runway and oscillates the lever 45 on its pivotal support so as to move the arms 46 into the path of travel of the cans. The solenoid 53 as shown in Fig. 11 is connected to the lines 55 and 56 which are in turn connected to the mercury switch tube 18. When the cans give out and the arms 9 and 11 swing so as to establish the circuit in the mercury switch tube 19, it also establishes a circuit in the mercury switch tube 18, energizes the solenoid 53 and causes the arms 46 to be swung into the path of travel of the cans.

The belt 3 is continuously traveling as it is operated independently of the machine with which this control mechanism is associated. When a new supply of cans is brought to the machine, they are often brought in in more or less of a straggling relation. The cans will contact with these arms 46 which are held in the path of travel of the cans and they will accumulate as the belt will slide underneath the cans when they are stopped. After sufficient cans have accumulated, however, then the arms 46 will be forced out of the path of travel of the cans and the cans allowed to pass these arms. As soon as they pass the arms 46, then they engage the arms 9 and 11 and force said arms out of the path of travel of the cans. This movement of the arms 9 and 11 to the position shown in Fig. 6 will cause the circuits to be broken. When the circuits are broken, the arms 46, 46 remain in the position to which they have been forced by the cans without any lateral strain on the cans as they pass and at the same time, the spring will operate to shift the valve so as to start the machine in operation.

From the above it will be apparent that a control has been provided for a machine wherein the machine is automatically stopped when there are no articles to be operated upon, and it is again automatically started when the articles are brought to the machine in sufficient quantity to supply the machine continuously in operation.

While the invention has been described as applied to a can making machine, it is understood that it may be used in connection with any machine for producing articles, and while the control mechanism has been described in detail as stopping and starting the machine, it will also be understood that it may render the machine operative and inoperative in any well known way.

Having fully described our invention, what we claim as new and desire to secure by Letters Patent, is:—

1. The combination of control means for rendering the machine operative or inoperative, a continuously operated conveyor for delivering articles to the machine, means operated by the articles delivered for rendering the control means effective for stopping the machine when there are no articles to be operated upon and for starting the machine when articles are again delivered to the machine and means associated therewith for preventing the starting of the machine until the articles accumulate sufficiently to supply the needs of the machine.

2. The combination of means for rendering a machine operative and inoperative, a continuously operated conveyor for delivering articles to the machine, means controlled by the articles delivered for rendering the machine inoperative when there are no articles to be operated upon and operative when the articles are again delivered to the machine, and means associated therewith for preventing the rendering of the machine operative until the articles accumulate sufficiently to supply the machine.

3. The combination of means for rendering a machine operative and inoperative, a continuously operated conveyor for delivering articles to the machine, electrically actuated means controlled by the articles delivered for stopping the machine when there are no articles to be operated on and for starting the machine when the articles are again supplied, and electrically actuated means associated therewith for preventing the rendering of the machine operative until the articles accumulate sufficiently to supply the machine.

4. The combination of pneumatic means for rendering a machine operative and inoperative, a continuously operated conveyor for delivering articles to the machine, means controlled by the articles delivered for stopping and starting the machine including arms supported for movement into the path of the conveyed articles, means for yieldingly forcing said arms into said path, an electric switch rendered operative when there are no articles to be operated upon and inoperative when the articles are passing said arms and means associated therewith for preventing the rendering of the machine operative until the articles accumulate sufficiently to supply the machine.

5. The combination of pneumatic means for rendering a machine operative and inoperative, a continuously operated conveyor for delivering articles to the machine, means controlled by the articles delivered for stopping and starting the machine including a bracket, a shaft supported in said bracket, arms carried by the shaft and movable into the path of travel of the articles, a weight carried by the shaft for yieldingly forcing the arms into the path of travel, a plate carried by the shaft, and a mercury switch carried by the plate rendered operative or inoperative by the swinging of the shaft and means associated therewith for preventing the rendering of the machine operative until the articles accumulate sufficiently to supply the machine.

6. The combination of means for rendering a machine operative and inoperative, a continuously operated conveyor for delivering articles to the machine, means controlled by the articles delivered for stopping and starting the machine, and means controlled by the articles delivered for preventing the starting of the machine until a sufficient quantity of articles has accumulated to supply the machine, said last-named means including a pivoted lever, arms carried by said lever and movable into the path of travel of the articles, and yieldable means for forcing said arms into the path of travel of the articles for stopping the articles until a sufficient quantity has accumulated to supply the machine.

7. The combination of means for rendering a machine operative and inoperative, a continuously operated conveyor for delivering articles to the machine, means controlled by the articles delivered for stopping and starting the machine, and means controlled by the articles delivered for preventing the starting of the machine until a sufficient quantity of articles has accumulated to supply the machine, said last-named means including a lever associated with said conveyor, arms carried by the lever and adapted to be moved into the path of travel of the articles, and electric means for moving said arms into the path of travel of the articles controlled by the means for stopping the machine.

8. The combination of means for rendering a machine operative and inoperative, a continuously operated conveyor for delivering articles to the machine, means controlled by the articles delivered for rendering the machine inoperative when there are no articles to operate upon and for rendering the machine operative when the articles accumulate sufficiently to supply the machine, and means associated therewith for preventing the articles from engaging said control means and starting the machine until sufficient articles accumulate to supply the machine.

HENRY A. FINK.
JOHN E. SCHMIDT.